3,300,909
METHOD FOR PRODUCING CONTACT LENS
Melvin Dwight Cooper, Evansville, and John C. Gorman, Warrick County, Ind., assignors of one-fourth to Charles A. Brizius, and one-fourth to J. Royston Victor, both of Evansville, Ind.
Filed Aug. 19, 1963, Ser. No. 302,858
5 Claims. (Cl. 51—284)

The present invention relates to a new and novel method for producing a bifocal contact lens having highly improved physical characteristics.

As is known, the conventional corneal contact lens is typically cut to fit the eyeball and the prescription of the wearer, and achieving a contact lens for bifocal usage has provided drawbacks in accordance with such prior cutting techniques. In this latter regard, and most importantly, the line of demarcation between the distant or far vision area and the reading or near vision area has not been clearly defined in the prior type cut lens, but, instead, is mostly wavy or "fuzzy," proving objectionable to the user, as well as oftentimes requiring an astigmatic correction. Although many alternative bifocal lens producing techniques have been considered, none has proven entirely satisfactory.

By virtue of the instant invention, the applicants have provided a new and novel method or technique for producing a corneal bifocal contact lens which is readily produced with highly satisfactory end results defined by nearly perfect optics. Briefly, the invention encompasses the manufacturing of such a lens from a conventional plastic material and the new and novel utilization of a covering compound therewith during several of the operational steps. After preliminary cutting and polishing for the inner concave surface, the plastic material is placed in an off-center relationship in a lathe for cutting the first vision area thereon, and, thereafter, after polishing, placed in an on-center relationship and partially covered, or laminated, with the aforesaid compound for cutting the second vision area. The resulting lens is then polished, any remaining covering compound removed, and finished in accordance with the desired prescription, providing a highly desirable finished lens with a clearly defined "sharp" line of demarcation between the vision areas thereon and, accordingly, nearly perfect optics.

Accordingly, the principal object of the present invention is to provide a new and novel method for producing a bifocal contact lens.

A further and more general object of the present invention is to provide a new and novel method or technique for producing a corneal bifocal contact lens which readily defines a sharp line of demarcation between the two vision areas thereon, and, which, at the same time, is readily and continually achieved by a technician with a minimum of manufacturing expense.

Figure 1:
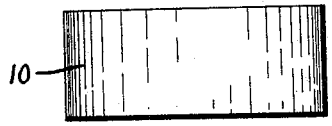
Figure 2:
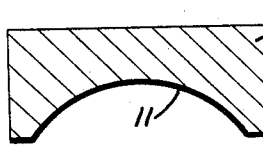
Figure 3:
Figure 4:
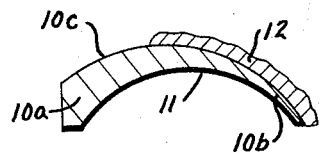
Figure 5:
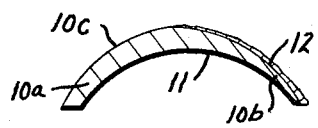
Figure 6:
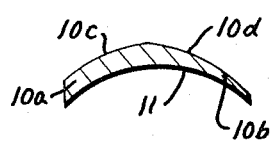

Other objects of the present invention will become more apparent from the following description, taken in conjunction with the accompanying drawing, wherein FIGS. 1 to 6, represent a flow diagram illustrating the teachings of the applicants' new and novel method for producing a corneal contact lens.

For the purposes of promoting an understanding of the principles of the invention, reference will now be made to the drawing and specific language will be used to describe the same. It will nevertheless be understood that no limitation of the scope of the invention is thereby intended, such alterations, further modifications and further applications of the principles of the invention being contemplated as would normally occur to one skilled in the art to which the invention relates.

Pursuant to the teachings of the invention at hand, a conventional slug or button 10 is employed, typically cut from a plastic rod and being broadly defined as a right circular cylinder in form. Thereafter, a base or concave curved surface 11 for the eye side of the slug is cut and polished therein, in accordance with known techniques.

Following the latter operation, the slug 10 is disposed on a holder (not shown), being centered and secured in such centered position by the use of heated pitch, for example. The holder, with the slug 10, is then placed on a lathe and the slug trued to position, i.e. so that the cutting tool is normal to the outer uncut surface thereof at its center position, also in accordance with conventionally known techniques.

Thereafter, the holder is disposed in an off-set tool, where the slug 10 assumes an off-center position with respect to the cutting tool in the order of a small fraction of an inch, but where its outer uncut surface is still maintained in the aforesaid trued position. The importance of such off-center position of the slug 10 determines, in part, the position of the line on the lens between the vision areas, i.e. the degree of curvature of the demarcation line between the vision areas. Restated otherwise, by off-centering, the cut slug 10 will have a thicker bottom portion 10a than top portion 10b, where such bottom portion 10a represents the thickened near vision area of the lens.

In any event, at this time, a curved surface 10d representative of far vision is cut and polished through a standard procedure, and when this operation is completed, the slug 10 is removed from its off-center position.

The distant vision surface 10d on the lens, as well as a portion of the uncut and polished near vision surface 10c, is thereafter covered with a compound 12 which plays an important part in the new and novel method defining the applicants' invention. Such covering compound 12 comprises shellac, talcum, resin, olec acid, and any desired indicating dye, and, importantly, is not gritty or soft, does not affect the plastic material which defines the slug 10, and is dissolvable in a solvent, for reasons which should be apparent herein. Typically, an impression compound guaranteed to comply with the American Dental Association Specification No. 3 has been found satisfactory.

After the preceding usage of the covering compound 12, the slug 10, in its holder (having been removed from the offset tool), is placed in a conventional lathe in an on-center position, and the cutting operation commenced. As should be apparent from the flow diagram, the covering compound 12 may be of any desired thickness when initially placed or laminated on the lens. After cutting is commenced, the covering compound 12 is subsequently shaped from a negligible thickness (in the area of the center of the lens) to a somewhat thicker amount at the narrowest portion of the lens, i.e. that which represents the top edge of the far vision surface.

After cutting is completed, a typical polishing operation is accomplished. At this time it should be understood that without the new and novel use of the instant covering compound 12, polishing of the near vision surface 10c could not be effected without breaking into the line of demarcation between such near vision surface 10c and the aforesaid far vision surface 10d. In other words, instead of achieving a well defined "clean" line of demarcation between such vision areas, a fuzzy uneven line would result, and one which proves objectionable to the wearer of the contact lens.

After the polishing of the near vision surface 10c has been completed, a small amount of covering compound 12 remains on the lens, and same is typically removed by a solvent, such as kerosene, for example. The lens is then cut to the desired corneal size, and, finished in accordance with the prescription at hand. In other words, and with particular reference to the bottom figure of the accompanying flow diagram, the line of demarcation between the far and near vision surfaces is clearly defined through the instant invention, and not rounded off as has been the primary objection of prior cutting techniques for producing bifocal contact lens.

From the preceding, it should be apparent that the applicants have provided an important contribution to the art of manufacturing corneal contact lens, and through the new and novel use of a covering compound, have overcome a serious criticism and objection inherent with prior cutting techniques for such lens manufacturing, and, provided nearly perfect optics to the finished lens. In addition to preserving and clearly defining the demarcation line between the far and reading portions of the lens, by a building or laminating operation utilizing the aforesaid covering compound, such covering compound also serves the incidental purpose of guiding the operator or technician during the cutting operation.

The method or technique defining the invention at hand is susceptible, of course, to changes within the spirit of the invention. For example, certain of the operations might be consolidated, while alternative covering compounds can be employed, i.e. covering compounds containing modified ingredients. Thus, the above description should be considered illustrative, and not as limiting the scope of the following claims.

We claim:

1. The method of producing a bifocal contact lens which comprises the steps of cutting and polishing a first surface on said lens, disposing a covering compound partially over said cut and polished first surface, cutting and polishing a second surface on said lens, and removing any covering compound remaining after said cutting and polishing of said second surface.

2. The method of producing a bifocal contact lens which comprises the steps of cutting a first curved surface on said lens at a first generatrix, polishing said first curved surface, disposing a covering compound partially over said cut and polished first surface, cutting a second curved surface on said lens at a second generatrix different from said first generatrix, polishing said second curved surface, and removing any covering compound remaining after said cutting and polishing of said curved second surface.

3. The method of producing a bifocal contact lens which comprises the steps of cutting a first surface on said lens at an off center radius with respect to the normal axis of said lens, polishing said first surface, disposing a covering compound over a large portion of said first surface, cutting a portion of said first surface and a portion of said covering compound at a radius on said normal axis of said lens to define a second surface, polishing said second surface without removing any covering compound remaining on said lens, and removing said covering compound to reveal a line of demarcation between said surfaces on said lens.

4. The method of producing a bifocal contact lens which comprises the steps of cutting a first curved surface on said lens at an off center radius with respect to the principal axis of said lens, polishing said first curved surface, disposing a covering compound over a large portion of said first curved surface, cutting a second curved surface having a different curvature than said first curved surface on a portion of said first curved surface and through a portion of said covering compound, polishing said second curved surface without removing any remaining covering compound, and removing said covering compound to reveal a line of demarcation between said curved surfaces on said lens.

5. The method of producing a bifocal contact lens which comprises the steps of cutting a first curved surface on said lens so that one edge of said lens is thicker than the opposite edge of said lens, polishing said first curved surface, disposing a covering compound on said first curved surface, cutting a second curve surface having a different curvature than said first curved surface on a portion of said first curved surface, polishing said second curved surface and said covering compound, and removing said covering compound to reveal a line of demarcation between said curved surfaces on said lens.

References Cited by the Examiner

UNITED STATES PATENTS

| | | | |
|---|---|---|---|
| 1,684,431 | 9/1928 | Behee | 51—312 |
| 1,871,123 | 8/1932 | Laabs | 51—284 X |
| 2,097,001 | 10/1937 | Taylor | 51—284 X |
| 2,106,981 | 2/1938 | Kavanaugh | 51—312 X |
| 2,237,744 | 4/1941 | Mullen | 82—1 |
| 2,904,419 | 9/1959 | Couch et al. | 51—295 |
| 3,064,401 | 11/1962 | Mooney | 51—284 |
| 3,089,763 | 5/1963 | Gladstone | 51—295 |
| 3,123,954 | 3/1964 | Calkins | 51—284 |

LESTER M. SWINGLE, *Primary Examiner.*

J. SPENCER OVERHOLSER, *Examiner.*

L. J. SHECHTER, *Assistant Examiner.*